(12) United States Patent
Perkins

(10) Patent No.: US 7,354,556 B2
(45) Date of Patent: Apr. 8, 2008

(54) PROCESS AND APPARATUS FOR IRRADIATING FLUIDS

(75) Inventor: John Patrick Perkins, Ilminster (GB)

(73) Assignee: Accentus PLC, London (GB)

( * ) Notice: Subject to any disclaimer, the term of this patent is extended or adjusted under 35 U.S.C. 154(b) by 878 days.

(21) Appl. No.: 10/722,494

(22) Filed: Nov. 28, 2003

(65) Prior Publication Data

US 2004/0081591 A1   Apr. 29, 2004

Related U.S. Application Data

(63) Continuation of application No. 09/857,880, filed on Jun. 12, 2001, now abandoned.

(30) Foreign Application Priority Data

Dec. 12, 1998  (GB) ................................ 98 27360.0

(51) Int. Cl.
*B06B 1/00* (2006.01)
(52) U.S. Cl. ........................ 422/128; 366/127; 210/748
(58) Field of Classification Search ........... 422/186.04, 422/128; 210/748; 366/127
See application file for complete search history.

(56) References Cited

U.S. PATENT DOCUMENTS

| 2,578,505 | A | * | 12/1951 | Benson ........................ 366/114 |
| 4,375,991 | A | * | 3/1983 | Sachs et al. .................... 134/1 |
| 5,484,573 | A | * | 1/1996 | Berger et al. ................ 422/128 |
| 5,658,534 | A | * | 8/1997 | Desborough et al. ....... 422/128 |
| 6,361,747 | B1 | * | 3/2002 | Dion et al. .................. 422/128 |

* cited by examiner

*Primary Examiner*—Kishor Mayekar
(74) *Attorney, Agent, or Firm*—William H. Holt

(57) ABSTRACT

Fluids in a vessel are subjected to a high ultrasonic intensity, by means of several ultrasonic transducers attached to a wall of the vessel, each transducer (14) radiating no more than 3 W/cm$^2$, the transducers being sufficiently close to each other, and the number of transducers being sufficiently high, that the power dissipation within the vessel is at least 25 W/liter. The number of transducers, the power of the transducers, and the volume of the vessel may be such that the power density is between 40 and 80 W/liter. The vessel may be double walled, and the space between the two walls be filled by a low attenuation buffer liquid (36) whose cavitation threshold is above that of the liquid being treated.

20 Claims, 1 Drawing Sheet

PROCESS AND APPARATUS FOR IRRADIATING FLUIDS

This is a continuation of application Ser. No. 09/857,880, filed on Jun. 12, 2001, now abandoned.

BACKGROUND OF THE INVENTION

The present invention relates to a process and an apparatus for subjecting fluids to irradiation by high intensity ultrasound.

If a liquid is subjected to a high ultrasonic intensity, that is to say an intensity greater than about 0.3 W/cm$^2$ at a frequency typically in the range 10 kHz to 100 kHz, then there is a significant deposition of energy into the liquid through attenuation and non-linear effects. This may lead to physical changes (for example streaming, mixing, or emulsification) or to chemical changes, and the present invention is principally concerned with the latter, which may be referred to as sonochemistry. The most significant sonochemical effects are usually associated with cavitation in the liquid, especially transient vaporous cavitation, which typically only occurs at an ultrasonic intensity above a threshold which is typically above 0.3 W/cm$^2$ and is different for different liquids.

An apparatus for subjecting a liquid to a very high intensity is described in GB 2 243 092 B (UKAEA), in which a transducer is attached to one end of a tapered resonant coupler, the coupler having a nodal flange; this flange is attached to a sleeve projecting from the wall of a pipe containing the liquid, and the spade around the sides and end of the coupler within the sleeve is filled with a coupling liquid such as olive oil. The use of such a nodal flange mounting enables a transducer of higher power to be used, but the apparatus is somewhat complex. It has also been suggested, for example in U.S. Pat. No. 4,433,916 (Hall), to attach a plurality of acoustic transducers directly to the wall of a cylindrical vessel containing a fluid, with a specified phase difference between the acoustic signals applied to adjacent transducers. Similarly, U.S. Pat. No. 4,369,100 (Sawyer) describes attaching ultrasonic transducers to the outer wall of an annular duct so that both the inner and outer walls are set in resonance. And U.S. Pat. No. 2,578,505 (Carlin) also describes a pipe with several transducers attached to the surface arranged in one or more circumferential rings.

BRIEF SUMMARY OF THE INVENTION

According to the present invention there is provided an apparatus for subjecting a fluid to irradiation by high intensity ultrasound, the apparatus comprising a generally cylindrical vessel, and a multiplicity of ultrasonic transducers attached to a wall of the vessel in an array that extends both circumferentially and longitudinally so as to radiate ultrasonic waves into a fluid in the vessel, the vessel being large enough that each transducer radiates into fluid at least 0.1 m thick, each transducer being connected to a signal generator arranged so that the transducer radiates no more than 3 W/cm$^2$, the transducers being sufficiently close to each other, and the number of transducers being sufficiently high, that the power dissipation within the vessel is at least 25 W/litre but no more than 150 W/litre.

The values of power given here are those of the electrical power delivered to the transducer or the transducers, as this is relatively easy to determine. There will inevitably be losses in converting electrical to acoustic power, and in transmitting the acoustic power from the transducer into the fluid within the vessel, but these are difficult to assess accurately. The transducer typically is at least 90% efficient in converting electrical to acoustic power.

The power radiated by each transducer may for example be in the range 1-2 W/cm$^2$. This is a similar power intensity to that used in ultrasonic cleaning baths, and is above the threshold required to achieve cavitation. The resonant ultrasonic coupler with a nodal flange (as described in GB 2 243 092 B) can achieve significantly higher power intensities, for example radiating more than 10 W/cm$^2$, but the lower intensity ultrasound generated by the present invention can propagate much further through a liquid, and the stresses in the transducers are much less.

The thickness of fluid into which each transducer radiates, that is the width or diameter of the vessel, is preferably no more than 1.2 m, and in a preferred embodiment the vessel is cylindrical of diameter in the range 0.2 to 0.6 m, such as 0.3 m.

Preferably the number of transducers, the power of the transducers, and the volume of the vessel are such that the power density is between 40 and 80 W/litre, more preferably between 60 and 70 W/litre. Although this does not produce such high power densities as can be achieved with an irradiator as described in GB 2 243 092 (UKAEA), it enables a larger volume to be irradiated and with greater uniformity, at sufficient intensity to cause cavitation; this is partly because very high cavitation levels near the vessel wall can have the effect of shielding parts of the fluid further from the wall.

In a preferred embodiment the vessel is double walled, the transducers being attached to the outer wall, the fluid to be treated being enclosed within the inner wall, and the space between the two walls being filled by a low attenuation buffer liquid whose cavitation threshold is above that of the liquid to be treated.

The width of the gap between the two walls is desirably equal to a quarter wavelength in the coupling liquid (which for a frequency of 20 kHz would be about 18 mm), or an odd-numbered multiple of that distance, to optimise the matching of impedance.

In one embodiment some of the transducers are energized at one frequency and other transducers at a different frequency, for example at 20 kHz and at 40 kHz. This can be very effective at causing cavitation and energy deposition within a fluid.

BRIEF DESCRIPTION OF THE SEVERAL VIEWS OF THE DRAWINGS

The invention will now be further and more particularly described, by way of example only, and with reference to the accompanying drawings in which.

DETAILED DESCRIPTION OF THE INVENTION

Figure 1:
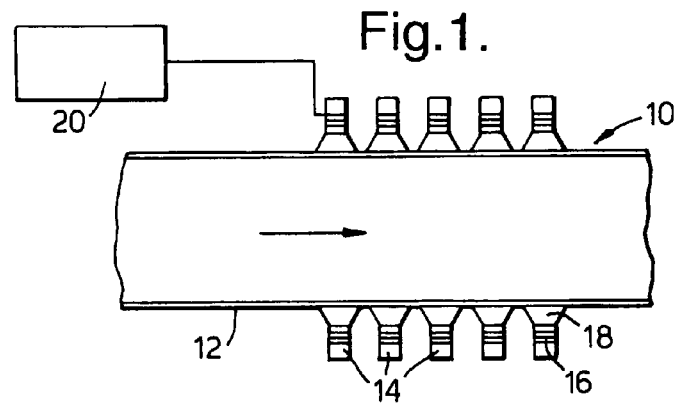
FIG. 1 shows a longitudinal sectional view through an irradiator apparatus.

Referring to FIG. 1 an irradiator 10 incorporates a stainless-steel duct 12 of internal diameter 0.31 m and of wall thickness 2 mm. To the outside of the wall are attached sixty transducer nodules 14 closely packed in a square array. Each transducer module 14 comprises a 50 W piezoelectric transducer 16 which resonates at 20 kHz, attached to a conically flared titanium coupling block 18 by which it is connected to the wall, the wider end of each block being of diameter 63 mm. The transducers modules 14 are arranged in five circumferential rings each of twelve modules 14, the centres of the coupling blocks 18 being on a square pitch of 82 mm. The irradiator 10 also incorporates five signal generators 20 (only one is shown) each of which drives all the transducers 16 in a ring. All the transducers 16 are activated at 20 kHz.

In use of the irradiator 10, a liquid is caused to flow through the duct 12 and each transducer 16 activated. Each transducer 16 radiates 50 watts over a circle of diameter 63 mm, that is an intensity of 1.6 W/cm$^2$. The energy from all the transducers 16 is dissipated over the cylindrical volume of the duct 12, that is to say over a volume of about 31 litres (that is the volume enclosed by the array of transducer modules 14), so the power density is about 97 W/litre, or about 80 W/litre if the ultrasonic irradiation is also effective 40 mm beyond each end of the array of transducer modules 14.

In one modification, three of the rings of transducers 16 are as described above, while the other two rings resonate at 40 kHz and are driven at that frequency (the rings being of alternate frequency along the duct 12). The power intensity and power density are as described earlier, but the fluid is consequently exposed simultaneously to two different frequencies generating cavitation. This can produce more effective sonochemical results.

Figure 2:
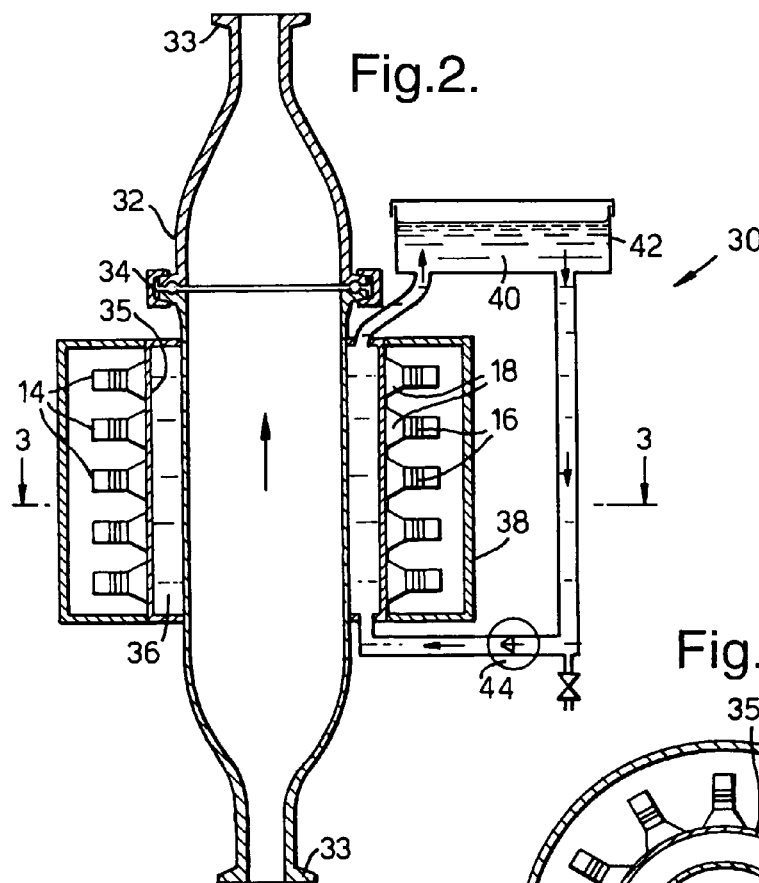
FIG. 2 shows a longitudinal sectional view through an alternative irradiator apparatus.
Figure 3:
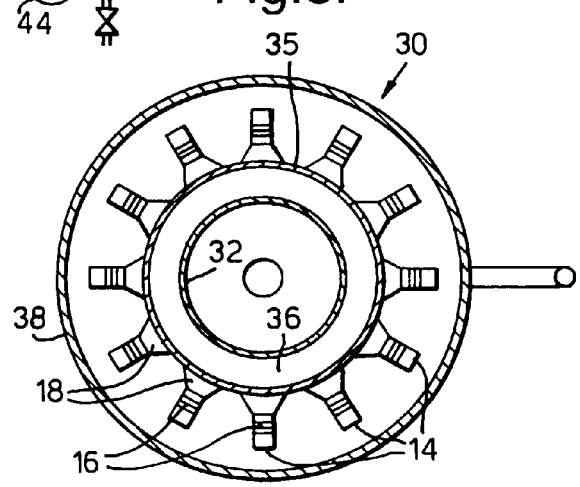
FIG. 3 shows a sectional view on the line 3-3 of FIG. 2.

Referring now to FIGS. 2 and 3 there is shown an alternative irradiator 30 which has many features in common with that of FIG. 1. The irradiator 30 includes a generally cylindrical duct 32 of polytetrafluoroethylene (PTFE) of internal diameter 0.31 m and of wall thickness 3 mm, which tapers at each end down to an internal diameter of 0.10 m and a wall thickness of 6 mm provided with a flange 33 for connection to other process ducts (not shown), and has a sealed joint 34 for inspection or cleaning purposes. Around the outside of the duct 32 is a concentric stainless-steel steel tube 35 of wall thickness 1 mm and of external diameter 0.354 m, such that there is a gap 36 of width 18 mm between the duct 32 and the tube 35. Sixty transducer nodules 14 are attached to the outer surface of the tube 35 in a rectangular array forming five rings of twelve, the spacing between the centers of the coupling blocks 18 being 82 mm parallel to the longitudinal axis of the tube 35 and 92.7 mm circumferentially. The array of transducers 14 is enclosed by an acoustic shield 38. A coupling liquid such as olive oil 40 is used to fill the gap 36 and is re-circulated from a reservoir 42 by a pump 44. This coupling liquid has a higher thteshold for cavita Lion than water, and has an impedance which is between that of the titanium coupling block 18 and that of the fluid within the duct 32 (typically mainly water, or an industrial solvent); at a frequency of 20 kHz the wavelength of the sound in this oil is 72 mm, so that the gap 36 is of width equal to a quarter of the wavelength.

In use of the irradiator 30, a liquid is caused to flow through the duct 32 and each transducer 16 is activated by a power supply (not shown) at 20 kHz. The dissipated power intensity and power density are as described in relation to FIG. 1. The impedance matching provided by the oil in the gap 36 allows more of the applied power to enter the fluid within the duct 32 while reducing erosion at the inner, irradiating, surface of the tube 35.

It will be appreciated that the power intensity in the irradiator 30 may be increased by increasing the numbers of transducer modules 14 in each ring. For example there might be sixteen transducer modules 14 in each ring, if the coupling blocks 18 were arranged on a circumferential spacing of 69.5 mm. This would increase both the power density and the power intensity by 33 percent. It will also be appreciated that the duct 32 can be of any material suited to the liquid being processed, and that it may form part of a pressure vessel. It will also be appreciated that the duct 12 or 32 need not be cylindrical but might for example be of square cross-section.

Furthermore the ultrasonic frequencies or frequencies might be different from those described above, and might be as high as 140 kHz or even 200 kHz, as such high frequencies tend to reduce the risk of cavitation erosion.

The invention claimed is:

1. An apparatus for subjecting a fluid to irradiation by high intensity ultrasound, the apparatus comprising a generally cylindrical vessel, and a multiplicity of ultrasonic transducer means for radiating ultrasonic waves at a frequency above 10 kHz into a fluid in the vessel, said transducer means being attached to an outer wall of the vessel in an array that extends both circumferentially and longitudinally, characterized by the vessel being large enough that each of said multiplicity of ultrasonic transducer means radiates into fluid at least 0.1 m thick, each of said transducer means being connected to a signal generator means for radiating no more than 3 W/cm$^2$, each of said transducer means being sufficiently close to each other, and the nunber of said transducer means being sufficiently high, that the power dissipation within said vessel is at least 25 W/liter but no more than 150 W/liter.

2. An apparatus as claimed in claim 1 wherein the power radiated by each of said transducer means is in the range 1-2 W/cm$^2$.

3. An apparatus as claimed in claim 1 wherein the niumber of said transducer means, the power of each of said transducer means, and the volume of the vessel are such that the power density is between 40 and 80 W/litre.

4. An apparatus as claimed in claim 1 wherein the vessel is double walled, with an inner wall and an outer wall with a space between them, said transducer means being attached to the outer wall, the fluid to be treated is enclosed within the inner wall, and the space between the two walls is filled by a low attenuation butter liquid whose cavitation threshold is above that of the liquid to be treated.

5. An apparatus as claimed in claim 1 comprising a plurality of said ultrasonic signal generator means, each signal generator means being arranged for energizing a separate group of said transducer means.

6. An apparatus as claimed in claim 5 wherein, in each said group, each of said transducer means are adjacent to each other.

7. An apparatus as claimed in claim 6 wherein at least one group of said transducer means resonates at a different frequency to other groups of said transducer means, and each signal generator means is arranged for energizing the respective group of said transducer means at their resonant frequency.

8. An apparatus as claimed in claim 5 wherein said transducer means are disposed in groups and at least one group of said transducer means resonates at a different frequency to other groups of transducer means, and each signal generator means is arranged for energizing the respective group of the transducer means at their resonant frequency.

9. An apparatus as claimed in claim 1 wherein each transducer means is attached to the outer wall by a coupling block which flares along its length and has its largest cross-sectional area where it contacts the wall.

10. A method for subjecting a fluid to irradiation by high intensity ultrasound, said method comprising the steps of:
selecting a generally cylindrical vessel having a diameter greater than 0.1 m;
attaching a multiplicity of ultrasonic transducer means to the wall of the vessel in an array that extends both circumferentially and longitudinally;
enclosing the fluid within the vessel;
connecting each transducer to a signal generator, and
energizing the transducers so that ultrasonic waves at a frequency above 10 kHz are radiated into the fluid within the vessel,
the improvement wherein each transducer means is arranged for radiating at a power intensity adjacent to the wall no more than 3 $W/cm^2$, and wherein said transducer means are sufficiently close to each other and the number of transducers are sufficiently high for limiting power dissipation within the vessel between at least 25 W/liter to no more than 150 W/liter.

11. A method as claimed in claim 10 wherein the power radiated by each of said transducer means is in the range 1-2 $W/cm^2$.

12. A method as claimed in claim 10 wherein the number of transducer means, the power of the transducers, and the volume of the vessel are such that the power density is between 40 and 80 W/liter.

13. A method as claimed in claim 10 wherein the vessel is double walled with an inner wall and an outer wall with a space between them said transducer means being attached to the outer wall, the fluid to be treated is enclosed within the inner wall, and the space between the two walls is filled by a low attenuation buffer liquid whose cavitation threshold is above that of the liquid to be treated.

14. A method as claimed in claim 10 including the step of providing a plurality of ultrasonic signal generators, each signal generator being arranged to energize a separate group of said transducer means.

15. A method as claimed in claim 14 wherein, in each said group, said transducer means are adjacent to each other.

16. A method as claimed in claim 15 wherein at least one group of said transducer means resonates at a different frequency to other groups of said transducer means, and each signal generator is arranged to energize the respective group of transducer means at their resonant frequency.

17. A method as claimed in claim 14 wherein at least one group of transducer means resonates at a different frequency to other groups of said transducer means, and each signal generator is arranged to energize the respective group of the transducer means at their resonant frequency.

18. A method as claimed in claim 10 including the step of attaching each transducer means to the wall of the vessel with a coupling block which flares along its length and has its largest cross-sectional area where it contacts the wall.

19. An apparatus for subjecting a fluid to irradiation by high-intensity ultrasound, the apparatus comprising a generally cylindrical vessel, and a multiplicity of ultrasonic transducers attached directly to the outside of a wall of the vessel in an array of separate transducers that extends both circumferentially and longitudinally for irradiating ultrasonic waves at a frequency above 10 kHz into a fluid in the vessel, wherein the vessel is large enough that each transducer radiates into fluid at least 0.1 m thick, each transducer being connected to a signal generator means arranged so the transducer radiates no more than 3 $W/cm^2$, the transducers being sufficiently close to each other, and the number of and proximity to each other of the transducers being such that the power dissipation within the vessel from said multiplicity of transducers is at least 25 W/liter but no more than 150 W/liter.

20. An apparatus as claimed in claim 19 wherein each transducer means is attached to the outside of the wall by a coupling block which flares along its length and has its largest cross-sectional area where it contacts the wall.

* * * * *